April 9, 1935. F. P. SMITH 1,997,437
SELF REFILLING MANOMETER
Filed Sept. 21, 1932
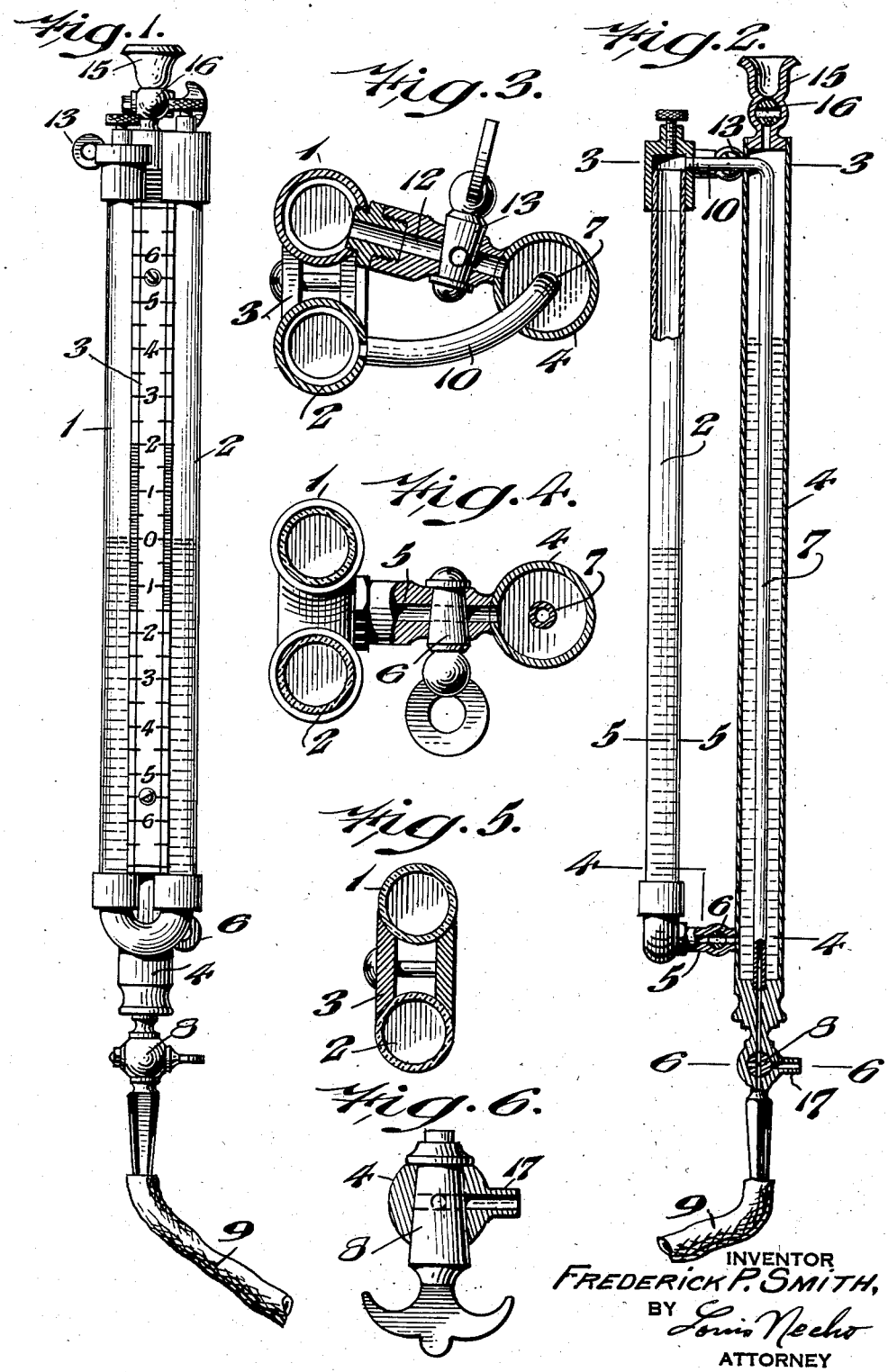
INVENTOR
FREDERICK P. SMITH,
BY
ATTORNEY Patented Apr. 9, 1935

1,997,437

UNITED STATES PATENT OFFICE 1,997,437

SELF-REFILLING MANOMETER

Frederick P. Smith, Glassboro, N. J.

Application September 21, 1932, Serial No. 634,092

3 Claims. (Cl. 73—31)

My invention relates to a new and useful self-refilling manometer of the type used by inspectors for testing gas pressures either at the production plants or in the pipe lines leading to the points of consumption and for sundry other similar uses.

Manometers of this character heretofore known and used have generally consisted of a U-shaped tube scaled to inches or other suitable units and having water therein, the upper end of one of the limbs of said U-shaped tube being open to the atmosphere and the upper end of the other of said limbs being adapted to be connected to the gas under pressure whereby the pressure of the gas served to depress the level of the indicating liquid, such as water and the like, in the limb of the tube connected to the gas pipe and correspondingly to raise the level of the liquid in the other of the limbs of said U-shaped tube, thereby indicating in inches or other units of measurement the pressure exerted by the gas. Due to occasional encountering of excessive gas pressure in excess of the measuring range of the manometer, it frequently happens that the water or other indicating fluid in the U-shaped tube is blown clear out of the limb of the U-shaped tube leading to the atmosphere, thereby necessitating the refilling of the manometer to bring the water level therein to the equalized "zero" reading. Such refilling is inconvenient, in that the particular fluid employed, colored or otherwise, water or the like, may or may not be available at the moment and for the reason that the refilling of the manometer involves dismantling of parts, as well as extreme care. Another disadvantage of manometers of this general character is resided in the fact that the amount of water or other indicating liquid used in the graduated U-shaped tube was necessarily limited in its level to the zero reading under normal conditions thereby indirectly delimiting the functional range of the manometer.

It is the purpose of my invention to produce a novel manometer which obviates these and other disadvantages, in that it is not limited to any particular zero reading and in that it is a self-refilling manometer, thus conserving the indicating fluid employed and obviating the necessity of refilling resulting from the otherwise inevitable loss of the indicating fluid.

To the above ends, my invention consists of a graduated U-shaped tube adapted to contain the indicating liquid, the upper end of one of the limbs of said U-shaped tubes being adapted to be connected to the source of gas, the pressure of which is to be tested, and the top end of the other of said limbs being connected to the atmosphere, a valve for closing the connection to the atmosphere, a reservoir adapted to contain a supply of the indicating liquid and connected to the bottom of said U-shaped tube through a valve, and a by-pass from the top of the limb of the U-shaped tube which is connected to the atmosphere leading into the top of said reservoir.

My invention further consists of various other novel features of construction and advantage, all as hereinafter described and claimed in connection with the accompanying drawing, in which:

Figure 1 represents a front elevation of a manometer embodying my invention.

Figure 2 is a side elevation of Figure 1, parts being broken away shown in section.

Figure 3 is a cross section on line 3—3 of Figure 2.

Figure 4 is a cross section on line 4—4 of Figure 2.

Figure 5 is a cross section on line 5—5 of Figure 2.

Figure 6 is a cross section on line 6—6 of Figure 2.

Referring to the drawing, my novel manometer comprises a front U-shaped tube having the limbs 1 and 2 which may be graduated or which may coact with a scale 3 graduated to inches or other pressure indicating units of measurement. Coacting with and secured to the U-shaped tube is the tank or reservoir 4 adapted to contain the indicating liquid employed and connected to the bottom of the U-shaped tube through the inlet 5 controlled by the valve 6 whereby water from the reservoir 4 may freely pass into the limbs 1 and 2 of the front U-shaped tube for the purpose hereinafter more fully set forth. Through the reservoir 4 extends the pipe 7 which is controlled by the three-way valve 8 and which is adapted to be connected at its bottom end to the hose 9 leading to the gas line, the pressure in which is to be tested. The pipe 7 communicates at its top 10 with the top of the limb 2, as seen in Figure 2, whereby with proper manipulation of the valve 8 gas is permitted to enter the upper portion of the limb 2 of the U-shaped tube to depress the indicating liquid therein an amount corresponding to the pressure of the gas measured in atmospheric units and correspondingly to raise the indicating liquid in the limb 1, the change in the level of the liquid in the limbs 1 and 2 from the zero reading to which the manometer is adjusted before the testing operation being an indication of the pressure of the gas. The top of the limb 1 is connected through the inlet 12 which is controlled by the valve 13 to the top of the reservoir 4 and through the outlet 15 and the valve 16 to the atmosphere so that with the valves 13 and 16 opened atmospheric pressure prevails on the surface of the indicating liquid contained in the limb 1. Under these conditions the pressure of the gas exerted on the indicating liquid in the limb 2 depresses the level of the water in the limb 2 and raises it in the limb 1, but as soon as the pressure is relieved and communication to the atmosphere is established through the valves 8, 13 and 16 the indicating liquid in the limbs 1 and 2 finds its own level and under ordinary conditions the level of the indicating liquid in both of the limbs 1 and 2 will be at zero. If it is desired to hold the reading resulting from the pressure of the gas it is necessary to shut off the valve 13 to exclude atmospheric pressure and to close the valve 8 from the source of gas and from the atmosphere, whereupon the level of the indicating liquid will be lower than zero in the limb 2 and above zero in the limb 1 to an extent measured by the pressure exerted by the gas. To bring the manometer back to zero the valve 13 is opened to the atmosphere and the valve 8 is manipulated to establish connection between the gas pipe 7 and the atmosphere outlet 17. Under ordinary conditions a manometer of the kind heretofore described would function fairly satisfactorily. In actual practice, however, I have found that the pressure of the gas exerted upon the surface of the indicating liquid in the limb 2 is very frequently in excess of the measuring range to which the conventional manometer is built with the result that the indicating fluid, which may be water or a more valuable fluid, is blown out through the necessary atmospheric outlet at the top of the limb 1. This results in decreasing the amount of indicating fluid so that when subjected to atmospheric pressure the level of the liquid in both of the limbs 1 and 2 will not be at zero but somewhat less than the normal amount required. To obviate this disadvantage, I have provided the novel reservoir 4 which is connected to the top of the limb 1 by the inlet 12 so that when and if the liquid in the limb 1 is blown out therefrom through excessive gas pressure in the limb 2 the indicating liquid will pass through the connection 12 into the reservoir 4, said liquid being subsequently readmitted into the U-shaped tube through manipulation of the valve 6 which controls the bottom inlet 5. By this means I am enabled to raise the level of the liquid in the U-shaped tubes 1 and 2 to the zero reading. The reservoir 4 is preferably of the same length as the U-shaped tube or longer and may contain enough water completely to fill the limbs 1 and 2 of the U-shaped tube so that I am enabled to set my device to any reading other than zero thereby altering the reading range of the device if so desired.

Having thus described my invention, what I claim as new and desire to secure by Letters Patent is:

1. A manometer comprising a reservoir adapted to contain a supply of indicating liquid, a U-gauge extraneous to and separate from said reservoir, means for establishing communication between the top of one leg of said gauge and the top of said reservoir, a controlled liquid connection between the bottom of said reservoir and the bottom of said gauge for introducing liquid from said reservoir to said gauge, and a controlled atmospheric outlet coacting with the top of said gauge and adapted to maintain the liquid level in said gauge at any point to which it may be raised by pressure to which the liquid in said gauge is subjected.

2. A self-refilling and levelling manometer comprising a U-shaped gauge adapted to contain an indicating liquid, means for admitting gas pressure to the top of one of the limbs of said U-shaped gauge, a controlled atmospheric outlet at the top of the other limb of said U-shaped gauge for maintaining the liquid level in said gauge at any point to which it may be raised by pressure, a reservoir extraneous to and separate from said U-shaped gauge, a by-pass leading from the top of one of the limbs of said U-shaped gauge to the top of said reservoir, and a by-pass connecting the bottom of said U-shaped gauge to the bottom of said reservoir.

3. A self-levelling and refilling manometer comprising a U-shaped gauge adapted to contain an indicating liquid, a separate reservoir adapted to contain a supply of said liquid, a controlled by-pass connecting the top of one of the limbs of said U-shaped gauge to the top of said reservoir, a controlled atmospheric outlet coacting with the top of said reservoir, a by-pass connecting the bottom of said reservoir with the bottom of said U-shaped gauge, and means for admitting pressure to the top of said gauge.

FREDERICK P. SMITH.